(12) United States Patent
Goel et al.

(10) Patent No.: US 8,086,701 B2
(45) Date of Patent: Dec. 27, 2011

(54) PLATFORM FOR MANAGING AND CONFIGURING NETWORK STATE

(75) Inventors: Mudit Goel, Redmond, WA (US); Paul G Mayfield, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 692 days.

(21) Appl. No.: 12/111,184

(22) Filed: Apr. 28, 2008

(65) Prior Publication Data

US 2009/0271510 A1 Oct. 29, 2009

(51) Int. Cl.
*G06F 15/16* (2006.01)
(52) U.S. Cl. .................. 709/220; 709/221; 709/224
(58) Field of Classification Search .................. 709/220, 709/223, 200, 221, 224, 201; 717/106
See application file for complete search history.

(56) References Cited

U.S. PATENT DOCUMENTS

| | | | |
|---|---|---|---|
| 6,965,932 B1 | 11/2005 | Rajaram et al. | |
| 6,983,317 B1 | 1/2006 | Bishop et al. | |
| 7,082,464 B2 | 7/2006 | Hasan et al. | |
| 7,165,104 B2 | 1/2007 | Wang | |
| 2003/0195921 A1* | 10/2003 | Becker et al. | 709/200 |
| 2004/0003067 A1* | 1/2004 | Ferrin | 709/223 |
| 2004/0148369 A1* | 7/2004 | Strassner | 709/221 |
| 2005/0138111 A1* | 6/2005 | Aton et al. | 709/201 |
| 2006/0212568 A1 | 9/2006 | Morris et al. | |
| 2006/0218548 A1 | 9/2006 | Mason et al. | |
| 2007/0058631 A1 | 3/2007 | Mortier et al. | |
| 2007/0150561 A1* | 6/2007 | Courtney | 709/220 |
| 2007/0244997 A1* | 10/2007 | Tindal | 709/220 |
| 2007/0298779 A1 | 12/2007 | Wolman et al. | |

FOREIGN PATENT DOCUMENTS

EP 1443701 A1 8/2004

OTHER PUBLICATIONS

Cook, "Picking the Right Network Management Platform", SunWorld, Jan. 1997, pp. 8.
"HP Network Node Manager (NNM) Advanced Edition 7.51 Software", 2003-2006, Hewlett-Packard Development Company,pp. 8.
"Managing Convergence with the Sun Unified Network Platform", 2007, Sun Microsystems, Inc., pp. 8.

* cited by examiner

Primary Examiner — Jungwon Chang (57) ABSTRACT

A network state platform for managing a network having a number of network nodes is disclosed. A user provides a policy layer a high level instruction indicative of the desired network performance. The policy layer parses the high level instruction to generate a number of configuration instructions for the network nodes. The network nodes provide data logs of their activity to a data layer that collates the logs into a single entry that is stored, and can be accessed by an observation layer. External applications interface with the observation layer to access the stored data and use this information to generate requests to change portions of the network configuration. These requests are provided to a control layer that converts the requests from the applications to a high level instruction that is then provided to the policy layer to implement.

20 Claims, 4 Drawing Sheets

PLATFORM FOR MANAGING AND CONFIGURING NETWORK STATE

TECHNICAL FIELD

This description relates generally to computer based networks and more specifically to configuring and managing a network

BACKGROUND

Computer based networks are commonly used by business and individuals to perform a variety of distributed functions as well as to access data located remotely from the users. Users typically access networks to obtain and/or store data and applications from remote locations. However, prior to using a network the network and more particularly the network nodes within it need to be configured according to the network administrators desires. The network administrator knows both which nodes need to be configured and how to configure the nodes to achieve the desired results.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide a method and system for configuring a network including a number of network nodes. The network nodes can include network servers (DNS, DHCP, RADIUS, VPN, etc), network devices (printers, routers, cameras, etc) and other devices that are connected to the network. A user or network administrator needing to configure the network for a specific task or use can interface with the network state platform through a user interface.

Through the user interface the user can provide a high level instruction to the policy layer of the network state platform. The policy layer parses the high level instruction to generate a number of configuration instructions for each of the network nodes that needing reconfiguration based on the high level instruction. These configuration instructions are passed to the nodes, which then configure themselves accordingly.

As users interact with the various network nodes, the network nodes produce data logs of this activity. These logs are provided to a data layer that collates the disparate data logs into a single record for a user. This information is stored in a database on a storage device. An observation layer of the network state platform can access this database and provide data from to applications that are connected to the observation layer. These applications perform operations that use the data from the data logs and determine if network changes are needed. The applications then return to the observation layer a request to change the network. The observation layer then passes these requests to the control layer. The control layer analyzes the requests from the observation layer and consolidates the multiple requests into a single high level instruction. This single high level instruction is then passed on to the policy layer to generate the appropriate configuration instructions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
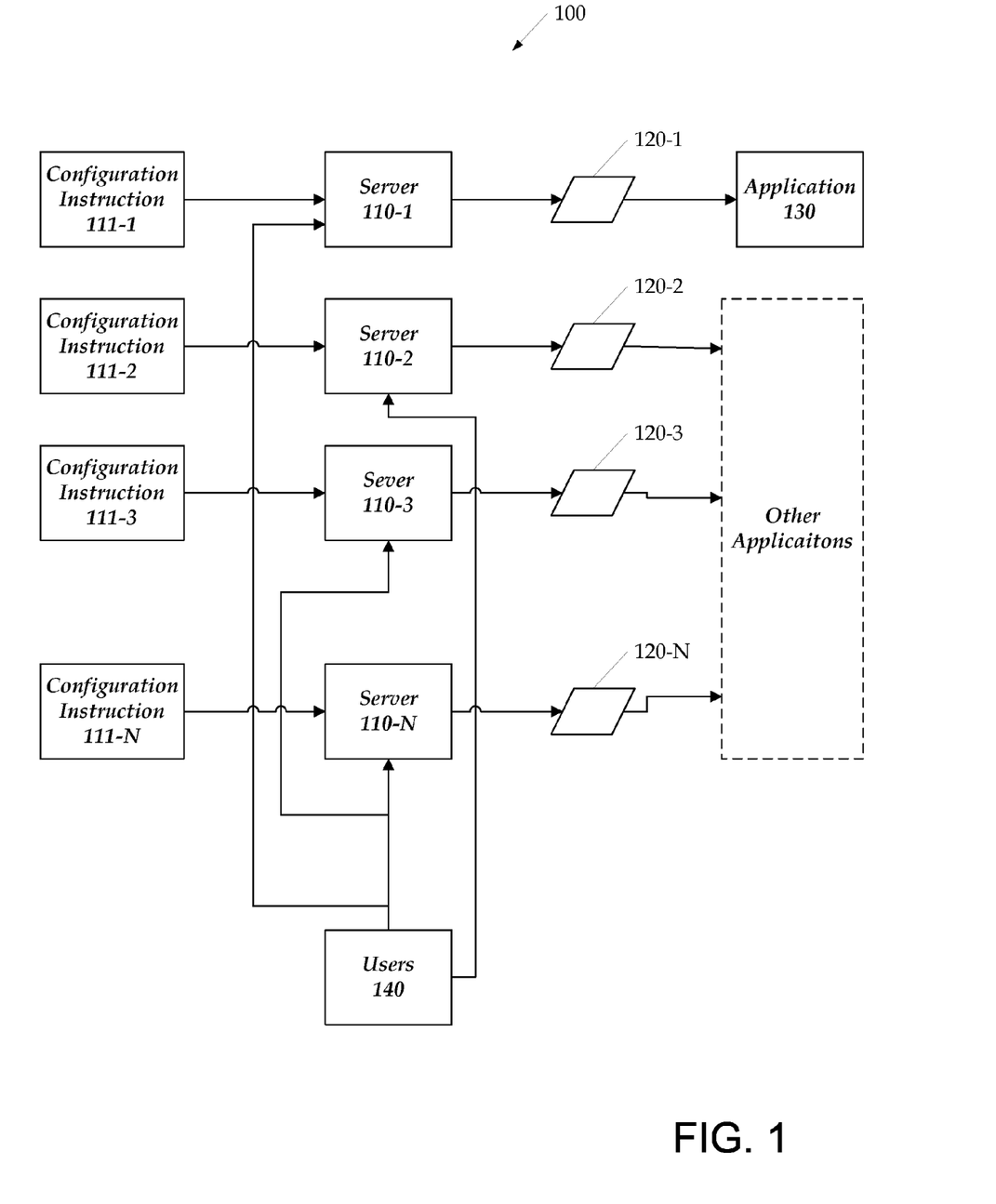
FIG. 1 is a block diagram of an network with a plurality of network nodes according to an illustrative example

FIG. 1 is a block diagram of a network system 100 within a network according to an illustrative example. Network system 100 provides a variety of network services. These services can include internet access, local network access, authentication, etc. Each of these services is provided by a different network device or server. Network system 100 includes a plurality of network servers 110-1, 110-2, 110-3, . . . 110-N. For example, sever 110-1 can be a DNS server, server 110-2 can be a RADIUS server, server 110-3 can be a DHCP server, and sever 110-N can be an email server. However, other types of servers may be present.

Each of the servers 110-1, 110-2, 110-3, . . . 110-N is configured using a configuration instruction 111-1, 111-2, 111-3, . . . 111-N that is provided by a network administrator. These configuration instructions 111-1, 111-2, 111-3, . . . 111-N that are provided to each of the servers 110-1, 110-2, 110-3, . . . 110-N must be in the language and protocol that that respective server 110-1, 110-2, 110-3, . . . 110-N understands. Thus, the network administrator must understand how each of the servers 110-1, 110-2, 110-3, . . . 110-N operates, and what configuration instructions 111-1, 111-2, 111-3, . . . 111-N are necessary to cause the server 110-1, 110-2, 110-3, . . . 110-N to perform the desired functions. The network administrator inputs these configuration instructions 111-1, 111-2, 111-3, . . . 111-N through the use of either a user interface or a command line that allows the administrator to send the desired configuration instruction 111-1, 111-2, 111-3, . . . 111-N to the appropriate server 110-1, 110-2, 110-3, . . . 110-N. The network administrator repeats this process for each server 110-1, 110-2, 110-3, . . . 110-N that needs to be configured. Once all of the servers or nodes 110-1, 110-2, 110-3, . . . 110-N have been configured to the desired settings various users 140 can interact with the network through the network servers and nodes 110-1, 110-2, 110-3, . . . 110-N.

As the users 140 interact with the network servers and nodes 110-1, 110-2, 110-3, . . . 110-N, a variety of information may be generated by each of the servers 110-1, 110-2, 110-3, . . . 110-N. This information is separate from the information or access actually provided by the server or service. For example, a DNS server may generate information that a specific machine requested an address for a specific site. This information may be output from the server 110-1, 110-2, 110-3, . . . 110-N, and stored as a data log, such as data log 120-1. Each server 110-1, 110-2, 110-3, . . . 110-N maintains its own data log(illustrated by logs 120-1, 120-2, 120-3, . . . 120-N) for activity that is associated with the server. This information in the data logs 120-1, 120-2, 120-3, . . . 120-N can be stored on a data storage device that is accessible by the administrator. The data logs 120-1, 120-2, 120-3, . . . 120-N provide a historical view of the activity on the respective servers 110-1, 110-2, 110-3, . . . 110-N.

If during the day-to-day operation of the network system 100, a problem is noticed in the performance of the system 100 or activity occurs on a server 110-1, 110-2, 110-3, . . . 110-N which is not approved of the network administrator may be notified of the problem. The administrator may be notified by a program, such as application 130, that monitors a specific server or may notice the problem on his own. In response to the notification of the problem, the administrator would access the data logs 120-1, 120-2, 120-3, . . . 120-N for the server and look at the activity in question. This review of the activity typically occurs sometime after the actual activity that caused the problem occurred. Based on the information in the data log 120-1, 120-2, 120-3, . . . 120-N, the administrator then will re-configure the appropriate server 110-1, 110-2, 110-3, . . . 110-N to handle the discovered issue by sending a new configuration instruction 111-1, 111-2, 111-3, . . . 111-N to the server 110-1, 110-2, 110-3, . . . 110-N. The process of reconfiguring the appropriate server 110-1, 110-2, 110-3, . . . 110-N is done in the same way that the initial configuration of the server was done.

Figure 2:
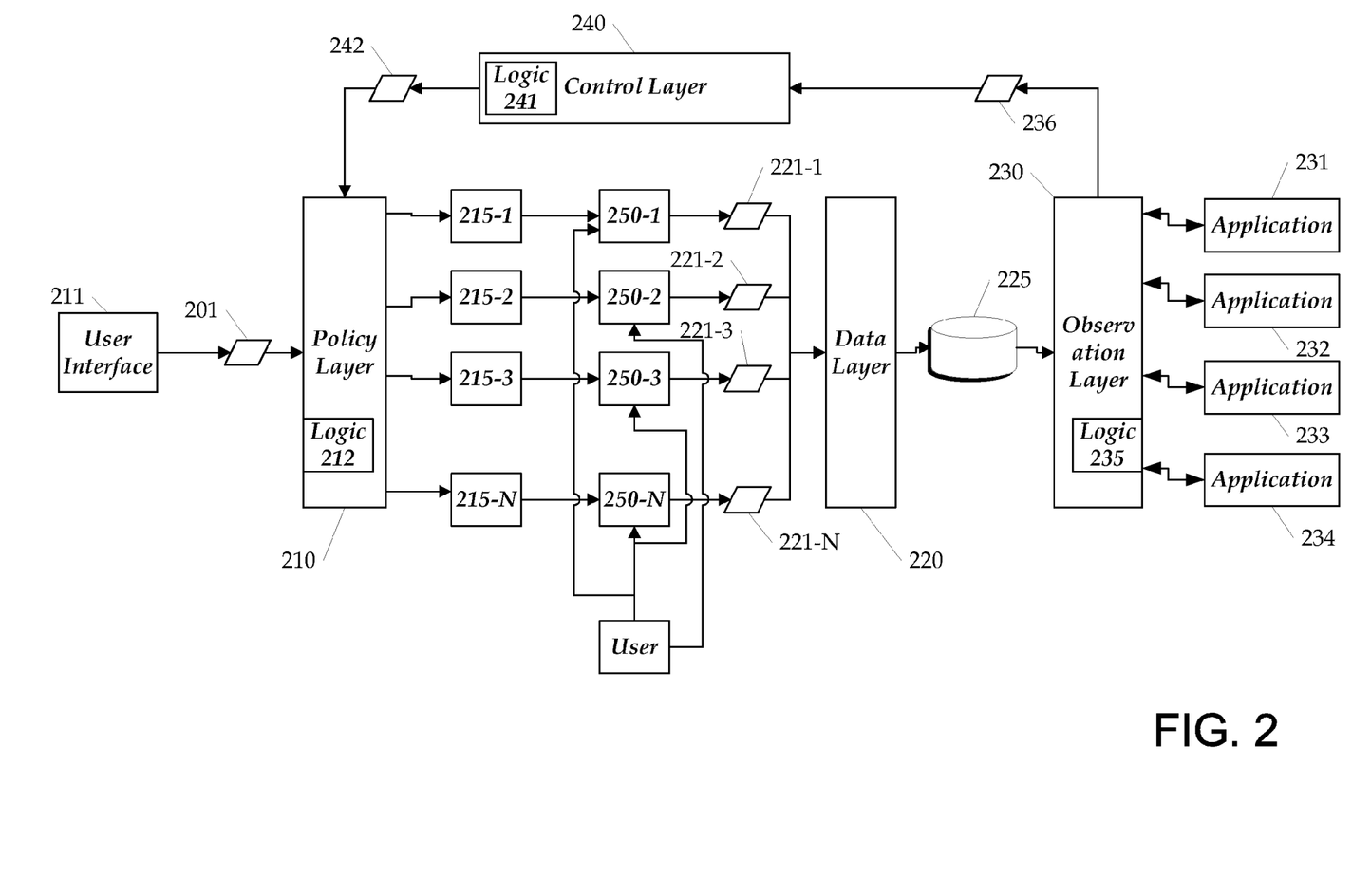
FIG. 2 is a block diagram of a network state platform according to an illustrative embodiment.

FIG. 2 is a block diagram of a network state management system 200 according to one embodiment. Network state management system 200 interacts with a network that is similar to network system 100 discussed above in FIG. 1. Network state management system 200 includes a policy layer 210, a data layer 220, an observation layer 230 and a control layer 240. Further network state management system 200 connects with a plurality of network nodes 250-1, 250-2, 250-3, . . . 250-N.

The plurality of network nodes 250-1, 250-2, 250-3, . . . 250-N may be similar to the network servers discussed above with respect to FIG. 1. However, in addition to including servers, network nodes 250-1, 250-2, 250-3, . . . 250-N can include a variety of other network devices that may from time to time need configuration. For example, network devices can include any other device that is connected to the network such as printer, router, scanner, etc.

The policy layer 210 is a component of network state management system 200 where high level policies 201 are received and then translated into configuration instructions 215-1, 215-2, 215-3, . . . 215-N for each of the network nodes 250-1, 250-2, 250-3, . . . 250-N that will need to be configured in order to implement the desired high level instructions. These high level instructions 201 are provided by the network administrator through, for example a user interface 211, or a command line. However, in some embodiments the high level policies 201 are provided by some user other than the network administrator (e.g. an administrative assistant for a building having an event). The high level instructions 201 are in one embodiment descriptions of the desired performance of the overall network that require multiple different configuration instructions across at least two of the network nodes/servers 250-1, 250-2, 250-3, . . . 250-N. For example, a high level instruction 201 can be "reserve 1000 addresses for an event in building X, lock down access to a data center for those addresses, assign a DNS suffix event.a.com, and provide wireless, but not wired, guest access based on the guests credentials." To implement this policy a number of configuration instructions 215-1, 215-2, 215-3, . . . 215-N would be needed to configure the nodes 250-1, 250-2, 250-3, . . . 250-N.

The policy layer 210 includes logic 212. Logic 212 correlates and validates configurations across the various network nodes 250-1, 250-2, 250-3, . . . 250-N. Further logic 212 generates the specific configuration instructions 215-1, 215-2, 215-3, . . . 215-N for each of the network nodes 250-1, 250-2, 250-3, . . . 250-N. In one embodiment the logic 212 parses the high level policy 201 to determine what changes are necessary to each node to generate the desired result. Logic 212 is programmed with the ability to generate the configuration instructions 215-1, 215-2, 215-3, . . . 215-N in the appropriate format and language for each node 250-1, 250-2, 250-3, . . . 250-N connected to the policy layer. This information can either be provided by the nodes 250-1, 250-2, 250-3, . . . 250-N when they connect to the policy layer 210 or can be pre-programmed into the layer. For example, to obtain the thousand addresses above, the logic 212 determines that the DNS server would need to obtain a thousand new addresses and associated them with a domain. Therefore, logic 212 would generate a configuration instruction for the DNS server that would cause the DNS server to be appropriately configured. A similar procedure would be performed by logic 212 to configure the RADIUS server for the desired wireless access. i.e. a configuration instruction would be generated to permit the new addresses to have wireless access in the appropriate building.

The data layer 220 is a component within network state management system 200 where the network nodes 250-1, 250-2, 250-3, . . . 250-N transmit all of their associated data logs. The data logs 221-1, 221-2, 221-3, . . . 221-N are logs that are generated by the nodes 250-1, 250-2, 250-3, . . . 250-N to report on their activity. (e.g. DHCP lease data, RADIUS transaction history, etc). In one embodiment the interface between the nodes and the data layer 220 is through an application program interface (API). The data layer 220 correlates the data received in the data logs 221-1, 221-2, 221-3, . . . 221-N from the network nodes 250-1, 250-2, 250-3, . . . 250-N. In one embodiment the data logs 221-1, 221-2, 221-3, . . . 221-N are correlated by comparing data in each log and identifying a corresponding entry in one log with an entry in another log. As the data contained in the data logs 221-1, 221-2, 221-3, . . . 221-N reported by the various nodes 250-1, 250-2, 250-3, . . . 250-N do not necessarily contain the same information, the correlation process can use different data from each log to assist in the correlation process. For example, if node 250-1 outputs data A and data B, node 250-2 outputs data B and data C, and node 250-N outputs data A and data D the correlation can be achieved by aligning data A and data B to then provide the association of data A,B,C, and D together. Thus, by using different data points in the data logs it becomes possible to associate the disparate data logs together. The associated data logs are then stored in a network state database 225. The network state database 225 can be any type of database structure, such as SQL, XML, etc. Further the database 225 can be stored on any storage media available.

The observation layer 230 is a component within the network state management system 200 that is configured to read the data that is stored on the network state database 225. The observation layer 230 then exposes this data to applications 231, 232, 233, 234 that desire the information through an API(s). In the embodiment illustrated in FIG. 2 four applications are shown connected to the observation layer 230. These applications include, for example, an intrusion detection system 231, a network forensics application 232, a reporting application 233, and a helpdesk application 234. However, those skilled in the art will readily recognize that any number and types of applications can be connected to the observation layer 230. These applications 231-234 that connect to the observation layer 230 make requests to the observation layer 230 for specific portions of the data that is exposed by the layer through the API. The applications 231-234 process this data accordingly and then can provide back to the observation layer 230 a request/instruction to change the state or performance of the network. The observation layer 230 passes these instructions/requests to the control layer 240.

In some embodiments the observation layer 230 includes internal logic 235 that generates instructions/requests separate from the instructions generated by the applications. This internal logic 235 can be provided by the network administrator to perform specific analysis deemed important by the administrator, that may or may not be handled by one of the applications connected to the observation layer 230. For example, internal logic 235 may monitor the overall bandwidth used by the system and identify high bandwidth users. In another example, the internal logic 235 generates requests that are based on rules determined by the administrator. For example, a request to reduce user's bandwidth and to shut off access to various servers 250-1, 250-2, 250-3, . . . 250-N may be generated by the internal logic 235 based on a time of day, so as to free available resources to perform other functions.

The control layer 240 is a component that collates the instructions/requests 236 that are passed from the applications through the observation layer 230. In FIG. 2 the control layer 240 is illustrated as a separate component of system 200. However, in some embodiments control layer 240 can be a component of the policy layer 210 or the observation layer 230. The control layer 240 parses the various requests that are received from the observation layer 230 and converts those requests into a high level instruction 242 that is similar to the high level instruction 201 that was provided by the user interface 211 discussed above. In cases where two different requests are received that would result in conflicting instructions when generating the high level instruction 242, control layer 240 includes logic 241 to manage this situation. For example, one instruction may be a request to reduce bandwidth available to all users on the wireless network due to network load, and another instruction may be a request to boot from the network three users who are visiting high bandwidth unapproved sites. In this example, logic 241 can use rules to determine which requests should be used in the high level instruction 242. (e.g. the boot users request would take precedence over the reduce overall bandwidth). If the logic 241 cannot resolve the conflict using the rules, logic 241 may cause the control layer 240 to request input from the network administrator. Alternatively, logic 241 may simply ignore both of the conflicting requests.

Figure 3:
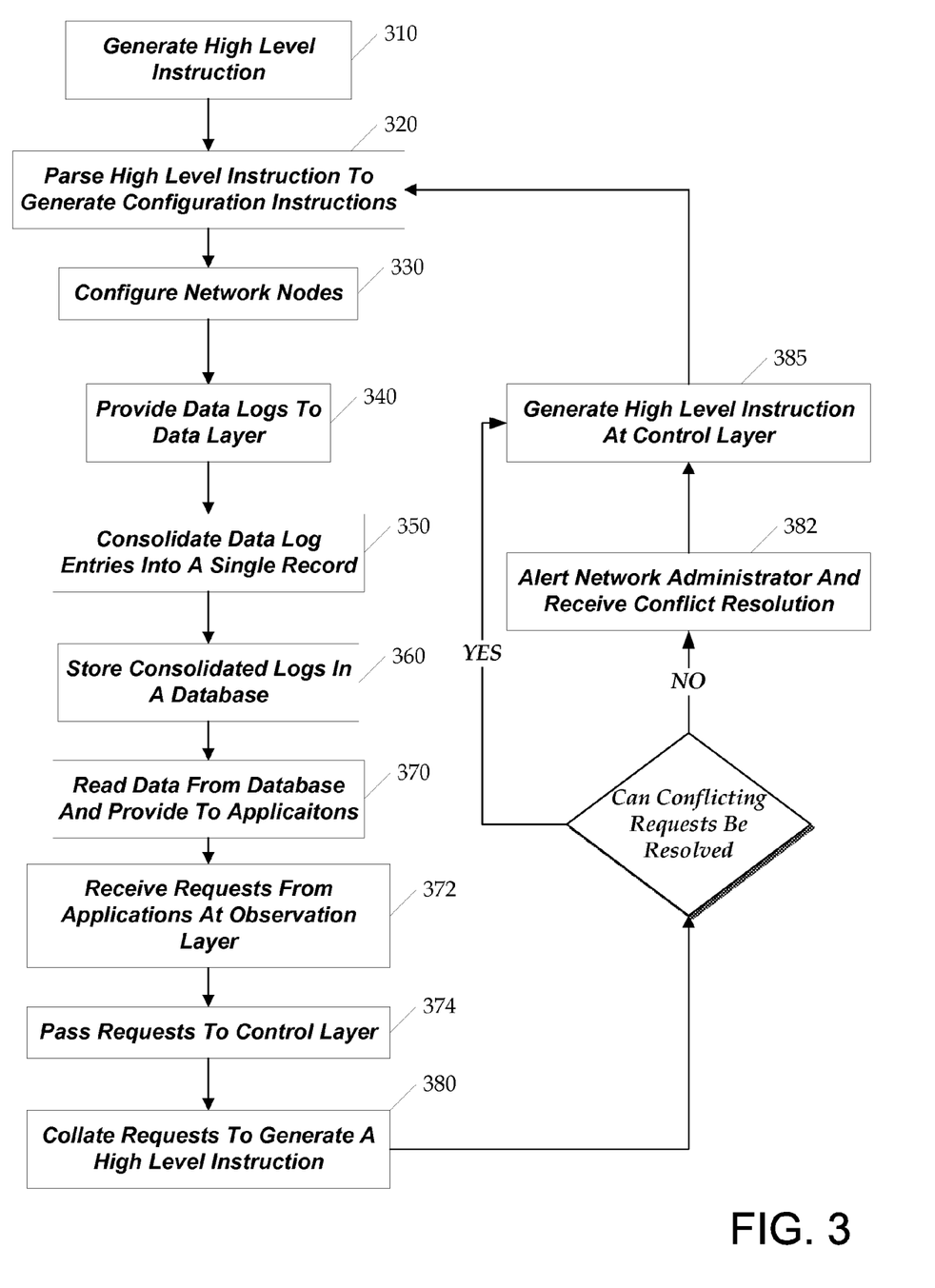
FIG. 3 is a flow diagram illustrating a process for managing a network using the network state platform according to an illustrative embodiment

FIG. 3 is a flow diagram illustrating a process for managing the network state management system 200 of FIG. 2 according to one illustrative embodiment.

The process of managing the network state management system 200 begins when the network administrator (or other user) determines what network changes are desired. For example, the network administrator may be faced with a thousand guests arriving at a specific site for a conference. Each of the guests will need network access however, the network administrator does not want to give them full access to the entire network, and may also desire to associate these guests as not being from the host organization. Thus, at step 310 the network administrator interfaces with a user interface 211 and enters the desired actions into the interface. This process generates the high level instruction 201. However, as discussed above, in some embodiments the network administrator may enter this information through a command line.

Once the high level instruction 201 for the network has been entered by the network administrator at step 310, this information is passed to the policy layer 210. The policy layer 210 parses the high level instruction, and generates a number of configuration instructions 215-1, 215-2, 215-3, . . . 215-N for the various servers, nodes and network devices 250-1, 250-2, 250-3, . . . 250-N on the network. For example, in the example discussed above, the policy layer 210 determines that a configuration instruction will need to be generated to request a thousand IP address from the DNS server, a configuration instruction will need to be sent to the DHCP server to associate those IP addresses with, for example, "event.a.com" and not "a.com" (where a.com is the name of the host organization), and a configuration instruction will be sent to the RADIUS server to provide these users with only wireless access. As the network administrator desired to only have the access in one building configuration instructions can be sent to the wireless routers in the building to accept the new addresses, while a separate set of configuration instructions can be sent to wireless routers in outer buildings instructing them to deny access to those address. The generation of these multiple different configuration instructions are illustrated at step 320.

Once the configuration instructions are sent to the various servers and nodes 250-1, 250-2, 250-3, . . . 250-N, the respective nodes respond to the configuration instructions by configuring themselves accordingly. This is illustrated at step 330. Once the servers and nodes 250-1, 250-2, 250-3, . . . 250-N have been configured, they are ready for the various users 255 to interact with them. As each user 255 accesses the network and interacts with the various servers and nodes 250-1, 250-2, 250-3, . . . 250-N, the respective nodes generate data logs 221-1, 221-2, 221-3, . . . 221-N indicative of that user's interaction with the associated server. For example the data log from the DNS server may state that a particular machine was given a specific IP address. The data log from the radius server may indicate that the particular machine accessed the wireless network in the building at a specific time. These data logs 221-1, 221-2, 221-3, . . . 221-N are output from the nodes and provided to the data layer 220 at step 340.

Once the data logs 221-1, 221-2, 221-3, . . . 221-N are received at the data layer 220, the logs must be consolidated into a single record that associates a particular machine/user with all of the data for that user. This is illustrated at step 350. Once the data logs 221-1, 221-2, 221-3, . . . 221-N for the machine/user are consolidated they are stored in the network state database 225. This is illustrated at step 360.

Once the network state database 225 has been populated with consolidated data from the data logs 221-1, 221-2, 221-3, . . . 221-N of the servers, the observation layer 230 then is able to read data from the network state database 225. The observation layer 230 reads this data from the database 225 in response to requests from applications 231, 232. 233, 234 that are connected to the observation layer. As discussed above with respect to FIG. 2, these applications can perform a variety of services that the network administrator or other person may desire. For example, an intrusion detection component can request information from the data logs 221-1, 221-2, 221-3, . . . 221-N that will help it determine if a user is attempting to access areas they are not permitted to access. Similarly, a forensic application, can request data from the observation layer 230 that will assist it in determining if users are compliant with a specific corporate or network policy. The process of providing this information to the applications is illustrated at step 370.

Once the applications are finished performing their analysis of the associated data they can generate requests to change the configuration of various components of the network. These instructions are provided back to the observation layer 230 at step 372. In response to the received instructions the observation layer 230 passes the instructions/requests to the control layer 240. This is illustrated at step 374. Also at this step, the observation layer 230 can send any requests that were generated by its own internal rules and processing.

The control layer 240 receives the requests from observation layer 230 and collates the requests go generate a single high level request. This is illustrated at step 380. As discussed above, the control layer 240 parses the instructions that are received to determine what the high level request should contain. Further, the control layer 240 attempts to resolve any conflicting requests that may have been received. If a conflict cannot be resolved the network administrator can be notified at step 382. Once the control layer 240 has resolved any conflicting instructions, a high level request is generated and transmitted to the policy layer 210 at step 385. However, if the control layer 240 notifies the network administrator at step 382, the transmission of the instructions at step 385 may be delayed until such time as a response is received from the network administrator. In an alternative embodiment, step 385 may be performed after waiting a predetermined period of time, or if the network administrator has decided not to be alerted step 385 may be performed immediately. In this embodiment the control layer 240 can ignore the conflicting instructions and generate the remainder of the high level instruction without the input from the network administrator, thus, preserving at least a portion of the feedback from the applications.

The high level instruction is received from the control layer 240 at the policy layer 210. The policy layer 210 takes the high level instruction and processes this instruction the same way as it processes instructions received at step 310. Thus the process returns to step 320 and the process illustrated in FIG. 3 repeats.

Figure 4:
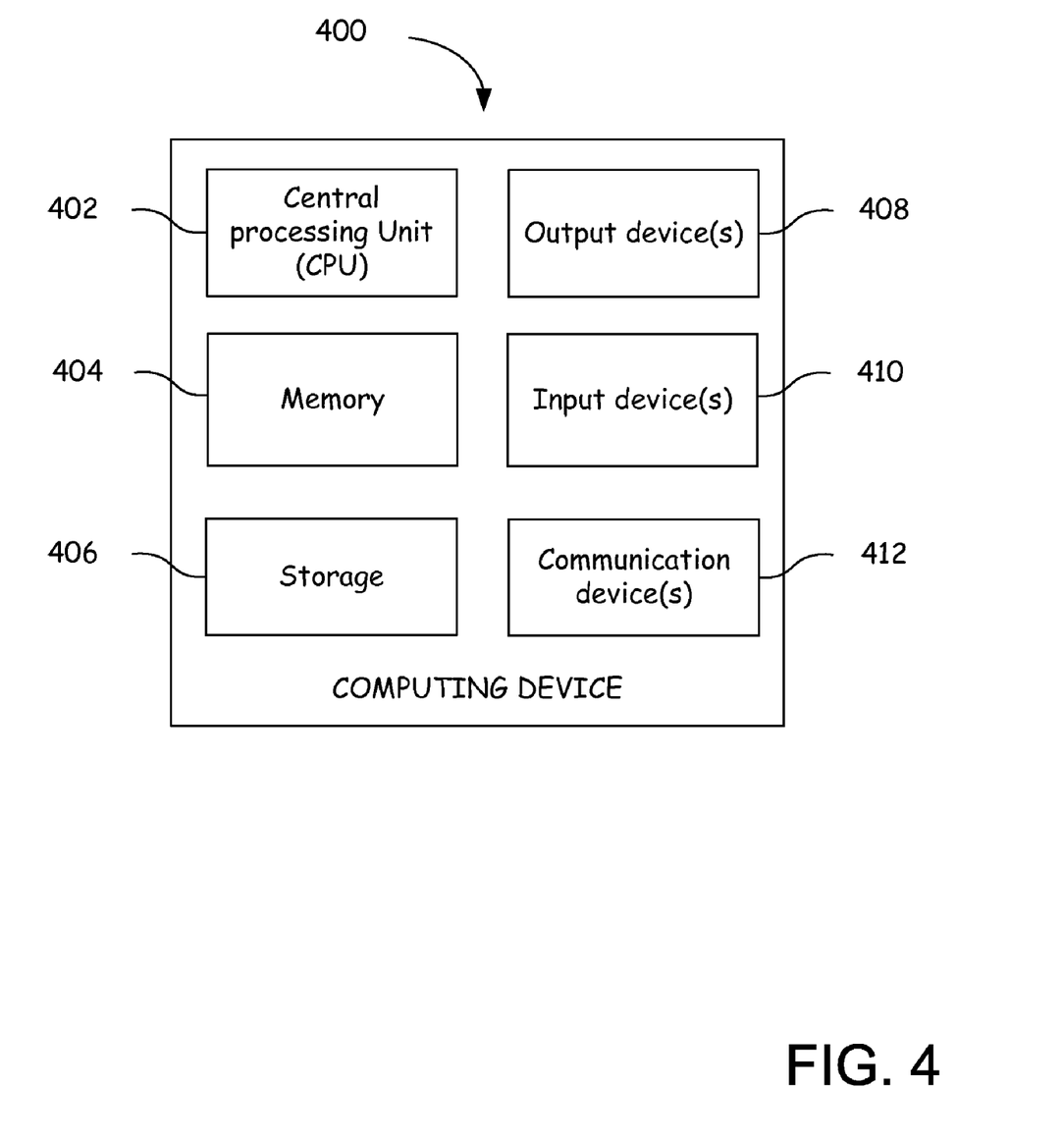
FIG. 4 is a block diagram illustrating a computing device which can implement the network state platform according to one embodiment.

FIG. 4 illustrates a component diagram of a computing device according to one embodiment. The computing device 400 can be utilized to implement one or more computing devices, computer processes, or software modules described herein. In one example, the computing device 400 can be utilized to process calculations, execute instructions, receive and transmit digital signals. In another example, the computing device 400 can be utilized to process calculations, execute instructions, receive and transmit digital signals, receive and transmit search queries, and hypertext, compile computer code, as required by network system 100 or 200.

The computing device 400 can be any general or special purpose computer now known or to become known capable of performing the steps and/or performing the functions described herein, either in software, hardware, firmware, or a combination thereof.

In its most basic configuration, computing device 400 typically includes at least one central processing unit (CPU) 402 and memory 404. Depending on the exact configuration and type of computing device, memory 404 may be volatile (such as RAM), non-volatile (such as ROM, flash memory, etc.) or some combination of the two. Additionally, computing device 400 may also have additional features/functionality. For example, computing device 400 may include multiple CPU's. The described methods may be executed in any manner by any processing unit in computing device 400. For example, the described process may be executed by both multiple CPU's in parallel.

Computing device 400 may also include additional storage (removable and/or non-removable) including, but not limited to, magnetic or optical disks or tape. Such additional storage is illustrated in FIG. 4 by storage 406. Computer storage media includes volatile and nonvolatile, removable and non-removable media implemented in any method or technology for storage of information such as computer readable instructions, data structures, program modules or other data. Memory 404 and storage 406 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 400. Any such computer storage media may be part of computing device 400.

Computing device 400 may also contain communications device(s) 412 that allow the device to communicate with other devices. Communications device(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 400 may also have input device(s) 47 such as keyboard, mouse, pen, voice input device, touch input device, etc. Output device(s) 408 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method of configuring a plurality of network nodes, the network nodes including at least two different types of network nodes, comprising:
receiving data indicative of a desired performance of a network including the plurality of network nodes;
converting the data into at least two separate configuration instructions, each of the configuration instructions associated with one of the plurality of network nodes;
transmitting the configuration instructions to the associated plurality of network nodes;
receiving data logs from each of the plurality of network nodes configured based upon the configuration instructions, the data logs providing a historical view of activity on each of the plurality of network nodes;
storing the data logs in an network state database;
reading at least a portion of the data logs from the network state database at an observation layer;
providing the portion of the data logs to at least one application;
receiving at the observation layer information from the at least one application, the information including at least one request to reconfigure the performance of the plurality of network nodes, the at least one request to reconfigure based on the portion of the data logs provided to the at least one application;
processing the at least one request at a control layer to generate data indicative of a desired reconfigured performance of the plurality of network nodes; and
converting, at a policy layer, the reconfiguration data into configuration instructions for at least one of the plurality of network nodes.

2. The method of claim 1 further comprising:
determining at the control layer that the information contains conflicting requests; and
resolving the conflicting requests through a logic module disposed on the control layer.

3. The method of claim 2 wherein when the control layer cannot resolve the conflicting requests:
sending an indication to a network administrator that there are conflicting requests;
receiving a resolution from the network administrator, the resolution indicating how to resolve the conflict; and
generating the instruction incorporating the indicated resolution.

4. The method of claim 2 wherein when the control layer cannot resolve the conflicting requests, the control layer removes the conflicting requests from the generated instruction.

5. The method of claim 1 further comprising:
generating, at the observation layer, requests to change the state of the network independent from the plurality of applications connected to the observation layer; and
passing the requests to the control layer along with requests received from the plurality of applications.

6. The method of claim 1, further comprising:
collating data in each of the data logs into a single entry, wherein a single entry represents activity of a user across the plurality of network nodes.

7. The method of claim 6 further comprising:
modifying output in the data logs for some of the plurality of network nodes to include data that allows for the data in the data log to be collated with data in other data logs from others of the plurality of network nodes.

8. One or more computer storage media storing computer readable instructions that when executed perform a method of configuring a plurality of network nodes, the network nodes including at least two different types of network nodes, the method comprising:
receiving data indicative of a desired performance of a network including the plurality of network nodes;
converting the data into at least two separate configuration instructions, each of the configuration instructions associated with one of the plurality of network nodes;
transmitting the configuration instructions to the associated plurality of network nodes;
receiving data logs from each of the plurality of network nodes configured based upon the configuration instructions, the data logs providing a historical view of activity on each of the plurality of network nodes;
storing the data logs in a network state database;
reading at least a portion of the data logs from the network state database at an observation layer;
providing the portion of the data logs to at least one application;
receiving at the observation layer information from the at least one application, the information including at least one request to reconfigure the performance of the plurality of network nodes, the at least one request to reconfigure based on the portion of the data logs provided to the at least one application;
processing the at least one request at a control layer to generate data indicative of a desired reconfigured performance of the plurality of network nodes; and
converting, at a policy layer, the reconfiguration data into configuration instructions for at least one of the plurality of network nodes.

9. The one or more computer storage media of claim 8, the method further comprising:
determining at the control layer that the information contains conflicting requests; and
resolving the conflicting requests through a logic module disposed on the control layer.

10. The one or more computer storage media of claim 9 wherein when the control layer cannot resolve the conflicting requests:
sending an indication to a network administrator that there are conflicting requests;
receiving a resolution from the network administrator, the resolution indicating how to resolve the conflict; and
generating the instruction incorporating the indicated resolution.

11. The one or more computer storage media of claim 9 wherein when the control layer cannot resolve the conflicting requests, the control layer removes the conflicting requests from the generated instruction.

12. The one or more computer storage media of claim 8, the method further comprising:
generating, at the observation layer, requests to change the state of the network independent from the plurality of applications connected to the observation layer; and
passing the requests to the control layer along with requests received from the plurality of applications.

13. The one or more computer storage media of claim 8, the method further comprising:
collating data in each of the data logs into a single entry, wherein a single entry represents activity of a user across the plurality of network nodes.

14. The one or more computer storage media of claim 8, the method further comprising:
modifying output in the data logs for some of the plurality of network nodes to include data that allows for the data in the data log to be collated with data in other data logs from others of the plurality of network nodes.

15. A system for managing and configuring a network comprising:
a plurality of network nodes, the network nodes including at least two different types of network nodes; and
a computing device comprising one or more processing units to:
receive data indicative of a desired performance of a network including the plurality of network nodes;
convert the data into at least two separate configuration instructions, each of the configuration instructions associated with one of the plurality of network nodes;
transmit the configuration instructions to the associated plurality of network nodes;
receive data logs from each of the plurality of network nodes configured based upon the configuration instructions, the data logs providing a historical view of activity on each of the plurality of network nodes;
store the data logs in a network state database;
read at least a portion of the data logs from the network state database at an observation layer;
provide the portion of the data logs to at least one application;
receive at the observation layer information from the at least one application, the information including at least one request to reconfigure the performance of the plurality of network nodes, the at least one request to reconfigure based on the portion of the data logs provided to the at least one application;
process the at least one request at a control layer to generate data indicative of a desired reconfigured performance of the plurality of network nodes; and
convert, at a policy layer, the reconfiguration data into configuration instructions for at least one of the plurality of network nodes.

16. The system of claim 15, wherein the computing device:
determines at the control layer that the information contains conflicting requests; and
resolves the conflicting requests through a logic module disposed on the control layer.

17. The system of claim 16, wherein when the control layer cannot resolve the conflicting requests the computing device:
sends an indication to a network administrator that there are conflicting requests;
receives a resolution from the network administrator, the resolution indicating how to resolve the conflict; and
generates the instruction incorporating the indicated resolution.

18. The system of claim 16, wherein when the control layer cannot resolve the conflicting requests, the control layer removes the conflicting requests from the generated instruction.

19. The system of claim 15, wherein the computing device:
generates, at the observation layer, one or more additional requests to change a state of the network independently from the at least one application connected to the observation layer; and
passes the one or more additional requests to the control layer along with the at least one request received from the at least one application.

20. The system of claim 15, wherein the computing device collates data in each of the data logs into a single entry, the single entry representing activity of a user across the plurality of network nodes.

* * * * *

UNITED STATES PATENT AND TRADEMARK OFFICE
CERTIFICATE OF CORRECTION

PATENT NO. : 8,086,701 B2  
APPLICATION NO. : 12/111184  
DATED : December 27, 2011  
INVENTOR(S) : Mudit Goel et al.

Page 1 of 1

It is certified that error appears in the above-identified patent and that said Letters Patent is hereby corrected as shown below:

In column 12, line 1, in Claim 15, delete "laver," and insert -- layer, --, therefor.
In column 12, line 22, in Claim 19, delete "laver," and insert -- layer, --, therefor.

Signed and Sealed this
Twenty-first Day of February, 2012

David J. Kappos
*Director of the United States Patent and Trademark Office*